(12) United States Patent
Ye et al.

(10) Patent No.: US 10,057,570 B2
(45) Date of Patent: Aug. 21, 2018

(54) METHOD AND APPARATUS FOR REGION OF INTEREST VIDEO CODING USING TILES AND TILE GROUPS

(71) Applicant: VID SCALE, INC., Wilmington, DE (US)

(72) Inventors: Yan Ye, San Diego, CA (US); Yuwen He, San Diego, CA (US); Yong He, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 15/373,452

(22) Filed: Dec. 8, 2016

(65) Prior Publication Data

US 2017/0094269 A1    Mar. 30, 2017

Related U.S. Application Data

(63) Continuation of application No. 14/030,204, filed on Sep. 18, 2013, now Pat. No. 9,554,133.
(Continued)

(51) Int. Cl.
*H04N 7/18* (2006.01)
*H04N 19/105* (2014.01)
(Continued)

(52) U.S. Cl.
CPC ......... *H04N 19/105* (2014.11); *H04N 19/167* (2014.11); *H04N 19/17* (2014.11);
(Continued)

(58) Field of Classification Search
CPC ...................................................... H04N 19/00
See application file for complete search history.

(56) References Cited

U.S. PATENT DOCUMENTS

2004/0151244 A1   8/2004   Kim et al.
2007/0237232 A1   10/2007   Chang et al.
(Continued)

FOREIGN PATENT DOCUMENTS

CN      101416524 A      4/2009
CN      101578865 A      11/2009
(Continued)

OTHER PUBLICATIONS

Bossen, Frank, "Common Test Conditions and Software Reference Configurations", Joint Collaborative Team on Video Coding (JCT-VC) of ITU-T SG16 WP3 and ISO/IEC JTC1/SC29/WG11, JCTVC-H1100, M24011, Feb. 1-10, 2012, 3 pages.
(Continued)

*Primary Examiner* — Andy Rao
(74) *Attorney, Agent, or Firm* — Condo Roccia Koptiw LLP

(57) ABSTRACT

Systems, methods, and instrumentalities are disclosed relating to region of interest (ROI) video coding using tiles and tile groups. An encoded video sequence including a plurality of tiles may be received. The plurality of tiles may be divided into one or more tile groups. Signaling indicating parameters of the one or more tile groups may be received. A tile group of the one or more tiles groups may be decoded and a picture relating to the decoded tile group may be displayed. The decoded tile group may overlap the ROI. The ROI may correspond to the displayed picture and the displayed picture may be a portion of the encoded video sequence. The tile groups that do not overlap the ROI may not be decoded.

20 Claims, 12 Drawing Sheets

Related U.S. Application Data

(60) Provisional application No. 61/702,676, filed on Sep. 18, 2012.

(51) Int. Cl.
    *H04N 19/167*    (2014.01)
    *H04N 19/17*     (2014.01)
    *H04N 19/174*    (2014.01)
    *H04N 19/55*     (2014.01)
    *H04N 19/46*     (2014.01)
    *H04N 19/593*    (2014.01)

(52) U.S. Cl.
    CPC ........... *H04N 19/174* (2014.11); *H04N 19/46* (2014.11); *H04N 19/55* (2014.11); *H04N 19/593* (2014.11)

(56) References Cited

U.S. PATENT DOCUMENTS

| | | |
|---|---|---|
| 2008/0151997 A1 | 6/2008 | Oguz |
| 2008/0152003 A1 | 6/2008 | Oguz |
| 2010/0232504 A1 | 9/2010 | Feng |
| 2012/0042050 A1 | 2/2012 | Chen et al. |
| 2012/0170648 A1 | 7/2012 | Chen et al. |
| 2013/0101035 A1 | 4/2013 | Wang et al. |

FOREIGN PATENT DOCUMENTS

| | | |
|---|---|---|
| JP | 2004-236337 A | 8/2004 |
| TW | 200845751 A | 11/2008 |
| WO | WO 2013/063094 A1 | 5/2013 |

OTHER PUBLICATIONS

Bross et al., "High Efficiency Video Coding (HEVC) Text Specification Draft 8", JCTVC-J1003, Joint Collaborative Team on Video Coding (JCT-VC) of ITU-T SG16 WP3 and ISO/IEC JTC1/SC29/WG11 10th Meeting, Stockholm, SE, Jul. 11-20, 2012, 294 pages.

Christopoulos et al., "The Jpeg2000 Still Image Coding System: An Overview", IEEE Transactions on Consumer Electronics, vol. 46, No. 4, Nov. 2000, 25 pages.

Coban et al., "Support of Independent Sub-Pictures", JCTVC-I0356, 9th Meeting: Geneva, CH, Apr. 27-May 7, 2012, 5 pages.

Hannuksela et al., "Isolated Regions in Video Coding", IEEE Transactions on Multimedia, vol. 6, No. 2, Apr. 2004, pp. 259-267.

ITU-R, "Parameter Values for Ultra-High Definition Television Systems for Production and International Programme Exchange", ITU-R Rec BT.2020, Aug. 2012, pp. 1-5.

ITU-T, "Advanced Video Coding for Generic Audiovisual Services", Recommendation ITU-T H.264, Mar. 2010, 676 pages.

Lambert et al., "Flexible Macroblock Ordering in H.264/AVC", Journal of Visual Communication & Image Representation, Apr. 1, 2006, pp. 358-375.

Lu et al., "CE4: Improvement on Efficiency of High-Level Syntax in Adaptive ROI Conditions", JVT-R043, Institute for Infocomm Research, Joint Video Team (JVT) of ISO/IEC MPEG & ITU-T VCEG (ISO/IEC JCT1/SC29/WG11 and ITU-T SG16 Q.6) 18th Meeting, Bangkok, Thailand, pp. 1-12.

Mavlankar et al., "Spatial-Random-Access-Enabled Video Coding for Interactive Virtual Pan/Tilt/Zoom Functionality", IEEE Transactions on Circuits and Systems for Video Technology, vol. 21, No. 5, Mar. 17, 2011, pp. 577-588.

Mavlankar et al., "Video Streaming with Interactive Pan/Tilt/Zoom", High-Quality Visual Experience, Springer, 2010, 26 pages.

Wang et al., "Tile Groups", JCTVC-G318, Qualcomm Incorporated, Joint Collaborative Team on Video Coding (JCT-VC) of ITU-T SG16 WP3 and ISO/IEC JTC1/SC29/WG11, Nov. 21-30, 2011, 10 pages.

Wiegand et al., "Overview of the H.264/AVC Video Coding Standard", IEEE Transactions on Circuits and Systems for Video Technology, vol. 13, No. 7, Jul. 2003, 17 pages.

Ye et al., "ROI Tile Sections", JCTVC-K0248 r2, InterDigital Communications and eBrisk Video, Joint Collaborative Team on Video Coding (JCT-VC) of ITU-T SG 16 WP 3 and ISO/IEC JTC 1/SC 29/WG 11, 11th Meeting, Shanghai, CN, Oct. 10-19, 2012, 8 pages.

METHOD AND APPARATUS FOR REGION OF INTEREST VIDEO CODING USING TILES AND TILE GROUPS

CROSS REFERENCE TO RELATED APPLICATIONS

This application is a continuation of U.S. patent application Ser. No. 14/030,204, filed Sep. 18, 2013; which claims the benefit of U.S. Provisional Patent Application No. 61/702,676, filed Sep. 18, 2012, the contents of which are hereby incorporated by reference herein.

BACKGROUND

High Efficiency Video Coding (HEVC) may achieve 2x compression ratio at the same subjective quality as H.264/AVC. With the explosive growth of smart phones and tablets, mobile video applications, such as but not limited to video streaming, video chat, video sharing, and gaming, have become part of people's daily life. The explosive growth of video traffic on mobile devices may put a significant demand on the wireless network infrastructure, even with the implementations of 4G mobile networks. HEVC may be utilized in the mobile space to alleviate some of the bandwidth problems. The utilization of Ultra HDTV (U-HDVC) may be a driving force for HEVC market adoption.

HEVC may include a number of coding tools, such as but not limited to extended video block sizes (e.g., up to 64×64), large transform sizes (e.g., up to 32×32), advanced motion vector prediction (AMVP), and sample adaptive offset (SAO) for improved coding efficiency. HEVC may provide support for parallelization, including tools such as but not limited to Wavefront Parallel Processing (WPP) and tiles, in additional to slice structure. When WPP and/or tiles are used, the video bitstream corresponding to one picture may be packetized into independently decodable subsets of bitstreams, but may not incur the additional overhead of slice headers. WPP and tiles may partition a picture into regions to enable simultaneous decoding of these regions in parallel.

SUMMARY

Systems, methods, and instrumentalities are disclosed relating to region of interest (ROI) video coding using tiles and tile groups. An encoded video sequence including a temporal series of pictures, a picture being partitioned into a plurality of tiles may be received. The plurality of tiles may be divided into at least one or more tile groups, provided that not all the tiles representing the picture are members of the tile group. Signaling indicating parameters of the at least one or more tile group may be received. A tile group may be decoded and an ROI of a picture relating to the decoded tile group may be displayed. Only the tile group in the ROI may be decoded. The parameters of the at least one or more tile groups may include the number of tile groups, a number of tiles in each tile group, and an index of each tile. The parameters of the at least one or more tile groups may be signaled in a picture parameter set (PPS), video usability information (VUI), or a supplemental enhancement information (SEI) message. A tile group may be constrained such that all pixels in the tile group are temporally predicted from pixels in the same tile group in its reference pictures.

Signaling indicating a region of interest (ROI) may be received by the video decoder, or an ROI otherwise determined. A ROI may be determined by either a sender or a receiver, or negotiated between the sender and the receiver. Signaling in the bitstream may be needed if the sender determines, or negotiates, the ROI. For example, a content provider may identify one or more regions of interest and may encode a representation of these ROI (spatial definition across time) into the bitstream itself (e.g., an ROI may be indicated through the pixel coordinates of its vertices relative to the top left corner of the picture). At the decoder side, the available ROI may be presented to an end user in a user interface, and the end user may select an ROI in order to view only that region. ROI information may also be transmitted outside the bitstream. In another example, a user interface may be provided which allows the end user to identify a region of interest in the displayed video content, the device may zoom to display the ROI, and such zooming may cause other areas of the video content to be excluded from the display. The ROI may correspond to the displayed picture and the displayed picture may be a portion of the encoded video sequence. The entire encoded video sequence may not be decoded, but only the displayed picture, or a tile group or tile groups overlapping the displayed picture.

DETAILED DESCRIPTION

A Region of Interest (ROI) refers to a portion of a picture in a video sequence, but not the entire picture, as described above. ROI coding may be utilized for mobile video applications. For example, since mobile devices may have a limited screen size, people may zoom into a particular area of the video while watching, for example, by touching an area of interest using a touchscreen, drawing a line or a box around an area of interest using a pointer device, or by some other means. Video content may be produced for a different purpose than mobile usage (e.g., TV broadcasting). Such content may be "re-purposed" for mobile applications, such as but not limited to video streaming (e.g., YouTube®, Hulu®, Amazon®, Netflix®, etc.). Automatic video resizing and retargeting may be utilized. Implementations described herein may utilize tiles to provide ROI video coding that provides reduced decoding complexity.

Figure 1:
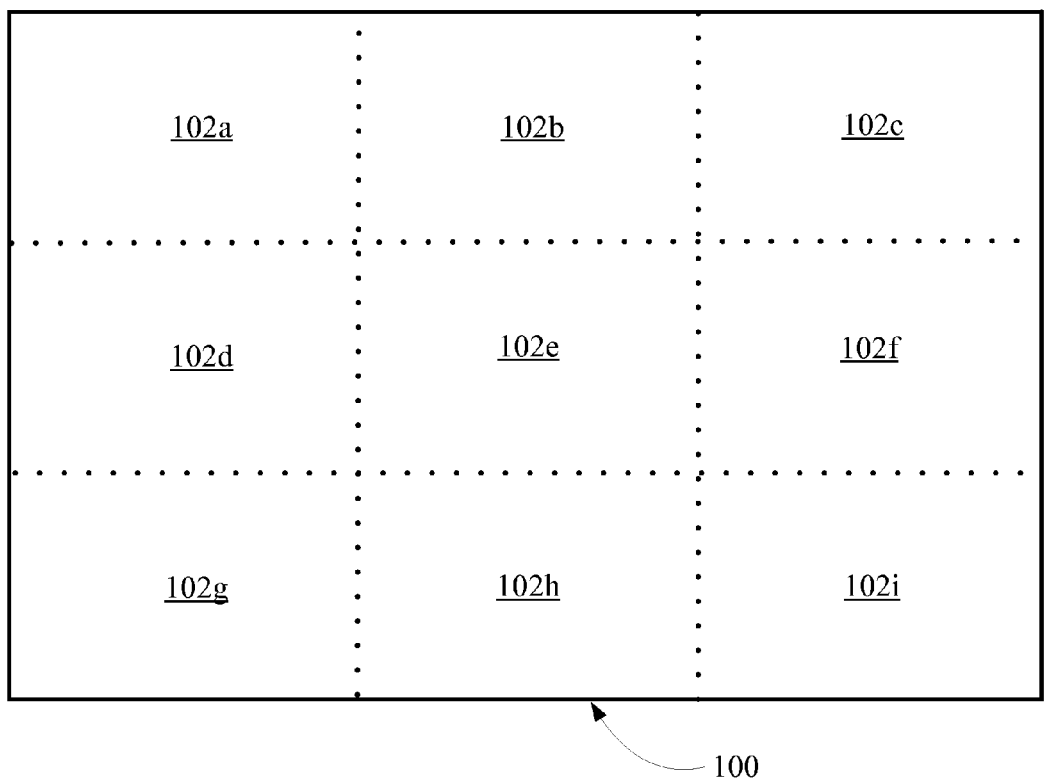
FIG. 1 is a diagram illustrating an example of evenly partitioning a picture into tiles in the horizontal and the vertical dimensions.

Tiles may be supported by HEVC. Tiles may partition a picture into rectangular regions of certain sizes. FIG. 1 is a diagram illustrating an example of evenly partitioning a picture 100 in the horizontal and the vertical dimensions into tiles 102a, 102b, 102c, 102d, 102e, 102f, 102g, 102h, 102i. Table 1 illustrates an example of a syntax structure for tiles in Picture Parameter Set (PPS) (e.g., in HEVC). If a tiles_enabled_flag is turned on, then the number of tiles in each dimension may be signaled. If the tiles are uniformly sized (e.g., if uniform_spacing_flag is 1), then no additional information may be signaled. The width and height of the tiles may be signaled. For example, as shown in FIG. 1, num_tile_columns_minus1 and num_tile_rows_minus1 may be set to 2 and uniform_spacing_flag may be set to 1. An additional flag loop_filter_across_tiles_enabled_flag may be used to indicate whether a deblocking filter will be applied across tile boundaries (e.g., a deblocking filter may be utilized to alleviate visible discontinuity along the boundaries).

TABLE 1

Example of Signaling of Tiles in PPS

| pic_parameter_set_rbsp( ) { | Descriptor |
|---|---|
| ... | |
| tiles_enabled_flag | u(1) |
| entropy_coding_sync_enabled_flag | u(1) |
| entropy_slice_enabled_flag | u(1) |
| if ( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| } | |

An encoder may change how the tiles are partitioned from picture to picture by the encoder signaling a new PPS with new tile partition parameters (Table 1). In one example, tiles need not remain equally sized compared to each other, or the same size compared to the same tile at an earlier instance; such that, if an ROI moves within a picture between two time instances, the encoder may signal a new PPS at the second time instance with new tile partition parameters that would allow the ROI to remain within its current tile or tiles. If the tile group membership remains static, the encoder may not signal any new tile group parameters.

Figure 2A:
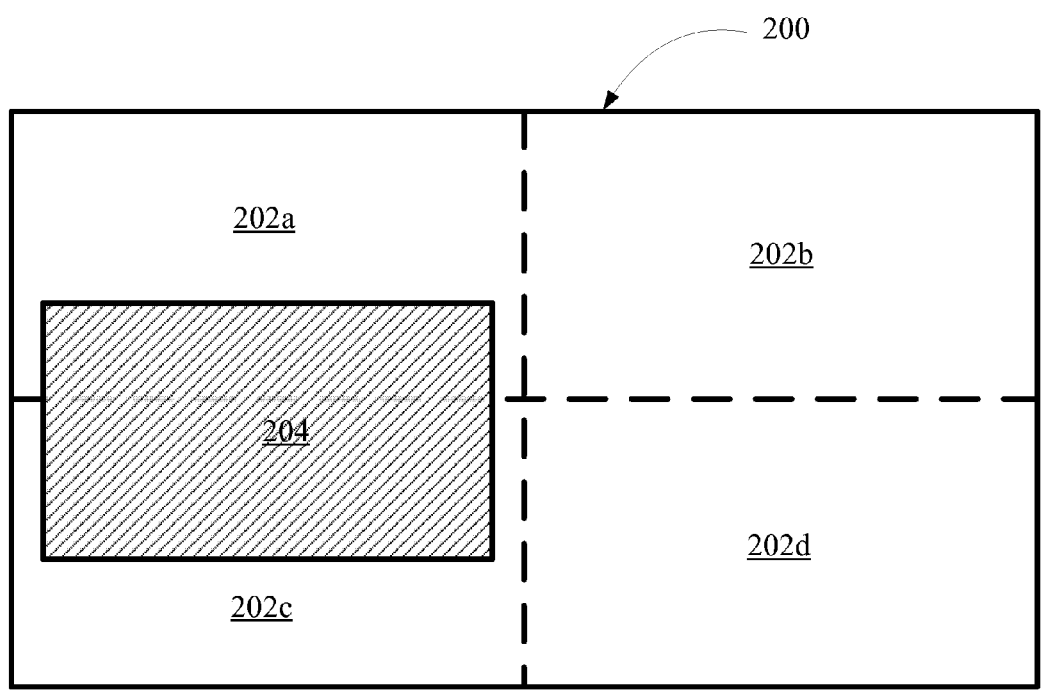
FIG. 2a is a diagram illustrating an example of an ROI contained within 2 out of 4 tiles.

FIG. 2a is a diagram illustrating an example of a picture 200 in a video sequence partitioned into (and coded as) tiles 202a, 202b, 202c, 202d. An ROI 204 is contained within two of the tiles 202a, 202c. The tiles 202a, 202c that the ROI 204 overlaps may be said to cover the ROI. The tiles 202a, 202b, 202c, 202d may be decoded independently. When the picture 200 is being decoded, decoding the tiles that the ROI 204 overlaps (e.g., the two tiles 202a, 202c) may be sufficient for displaying the ROI of the picture on the screen.

All of the tiles 202a, 202b, 202c, 202d in the picture 200 may be decoded even though a portion (e.g., only a portion) of the tiles (e.g., tiles 202a, 202c) may need to be decoded for the ROI 204 to be displayed (e.g., if the picture 200 is a reference picture). HEVC may use temporal prediction to reduce temporal redundancy inherent in video signals. All tiles (e.g., tiles 202a, 202b, 202c, 202d) in the picture may be decoded such that the picture 200 may be used as a reference picture to decode a subsequent picture in decoding order.

Figure 2B:
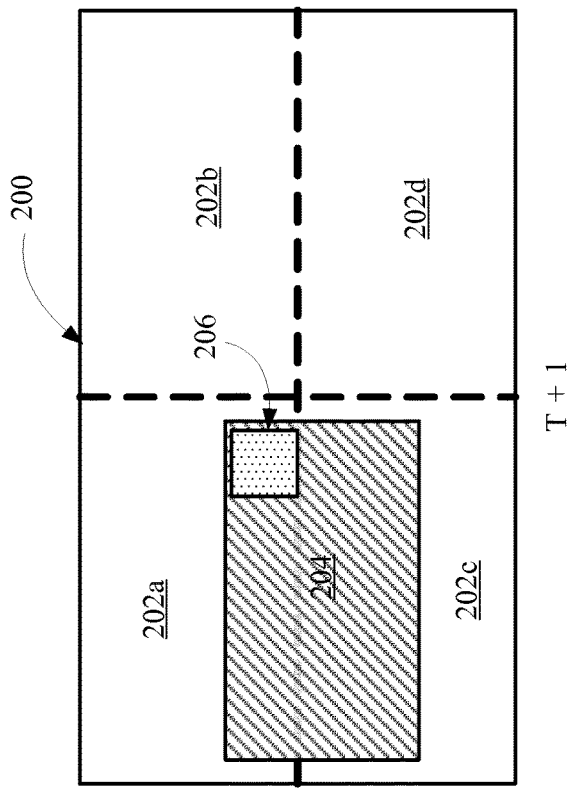
FIG. 2b is a diagram illustrating an example of a block inside a ROI at time instance (T+1), but outside of the ROI at time instance (T).
Figure 2B:
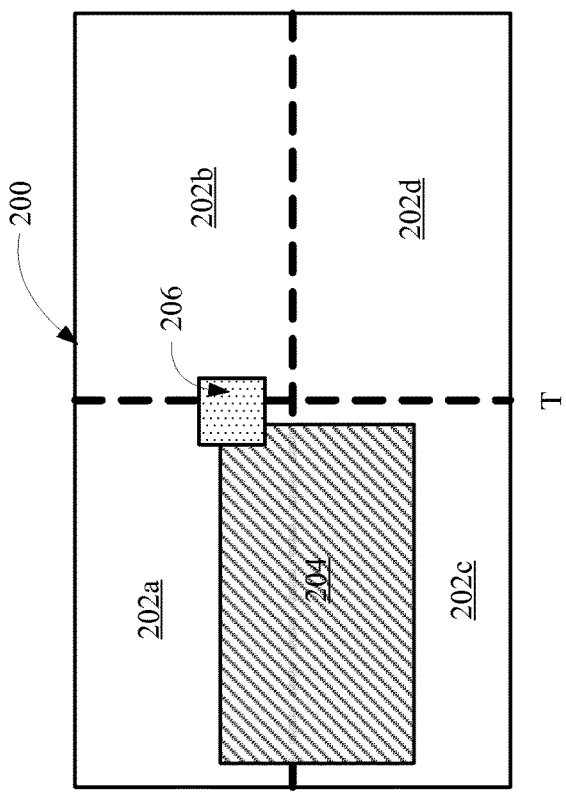

FIG. 2b is a diagram illustrating an example of a picture 200 in a video sequence partitioned into (and coded as) tiles 202a, 202b, 202c, 202d at a time instance (T). An ROI 204 is contained within two of the tiles 202a, 202c. A video block 206 (e.g., a group of pixels) is partially outside the ROI 204 at time instance (T). The block 206 bridges tiles 202a, 202b at time instance (T).

It may be desirable to predict the block 206 at a time instance (T+1), and to do so, the picture 200 at time instance (T) may be used as a reference picture to predict the picture 200 at time instance (T+1). The ROI may remain static. Since there may be no constraint in HEVC that motion estimation be confined within each of the tiles between the picture being decoded (e.g., the picture 200 at time instance (T+1)) and one or more of its reference pictures (e.g., the picture 200 at time instance (T)), the video block 206 at time instance (T+1) may be predicted from the video block 206 at time instance (3, if all of the tiles 202a. 202b, 202c, 202d in the reference picture at time instance (T) are decoded. The coding order may be the same as the display order, or the coding order of pictures in a video sequence may be different from the display order of pictures in a video sequence (e.g., the hierarchical B prediction structure).

Implementations are described herein for an encoder to put a constraint during motion estimation to ensure that motion compensated prediction may be performed within a subset of tiles that cover the ROI (e.g., the tiles 202a, 202c in the example of FIG. 2b). Implementations described herein may facilitate reduced complexity ROI decoding. Implementations described herein may reduce decoding complexity and power consumption, for example, by allowing a decoder to decode (e.g., only decode) a subset of tiles covering the ROI within a series of pictures in the temporal direction. Reduced decoding may be performed as long as the subset of tiles covering the ROI remains the same, as will be explained. This constraint may be signaled in the bitstream to inform the decoder that instead of full decoding (e.g., decoding of all of the tiles), reduced decoding (e.g., decoding a subset of the tiles) may be performed.

Tile groups may be utilized. A tile may refer to a collection of pixels pel whose coordinates may be within the tile boundaries, $bound_{left}$, $bound_{right}$, $bound_{top}$, $bound_{bottom}$. For example, $T=\{pel|coord_x(pel) \in [bound_{left}, bound_{right}]$ and $coord_y(pel) \in [bound_{top}, bound_{bottom}]\}$.

A tile group (TG) may refer to a combination of n tiles, $TG=\{T_0, T_1, \ldots T_{n-1}\}$, where $T_i$, $i=0 \ldots n-1$ may be tiles in a picture. A pixel sample pel may belong to a tile group TG if it belongs to a tile within the tile group. A tile group may satisfy the constraint (discussed herein) that motion compensated prediction may not go beyond its own boundaries. For example, if a pixel pel within a tile group TG in a picture is inter predicted, then it may be predicted (e.g., only predicted) from reference pixels within the same tile group TG in one or more of the reference pictures. Pixels in a tile group may satisfy the following constraint: If a reference pixel pel_ref in a reference picture does not belong to a tile group TG, then it may not be used for motion compensated prediction of a pixel sample pel_cur in the (current) picture that belongs to the tile group TG.

Figure 3:
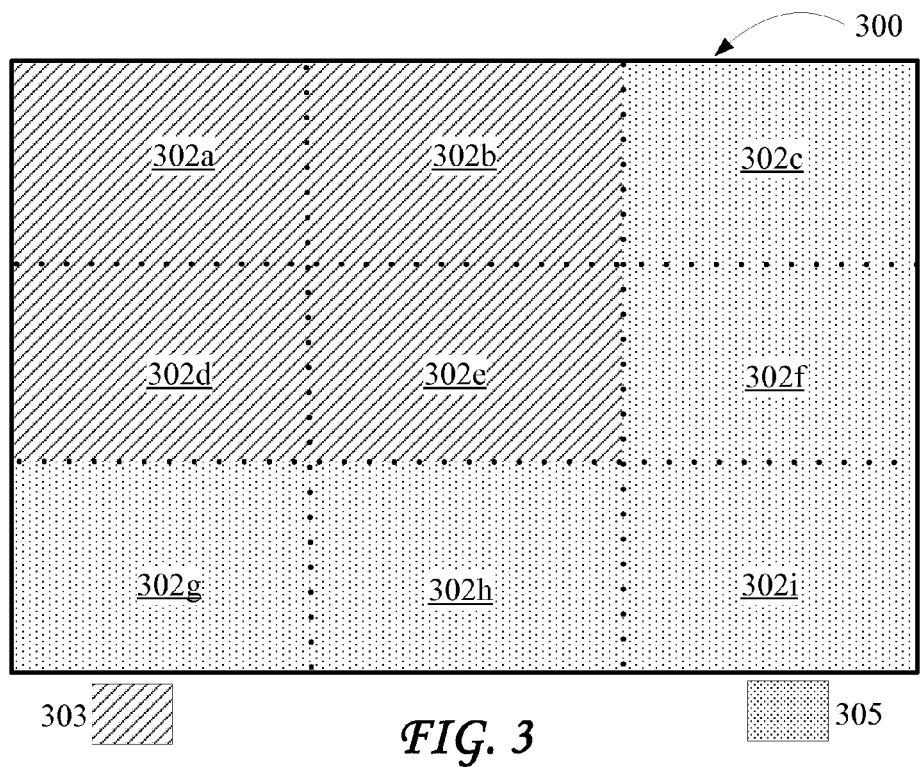
FIG. 3 is a diagram illustrating an example of grouping tiles of a picture into more than one tile group.

FIG. 3 is a diagram illustrating an example of a picture 300 in a video sequence partitioned into (and coded as) tiles 302a, 302b. 302c, 302d, 302e, 302f, 302g, 302h, 302i, with grouping of the tiles into tile groups 303, 305. The first tile group 303 may include tiles 302a, 302b, 302d. 302e. The second tile group 305 may include the remaining tiles 302c, 302f, 302g, 302h, 302i.

Figure 4:
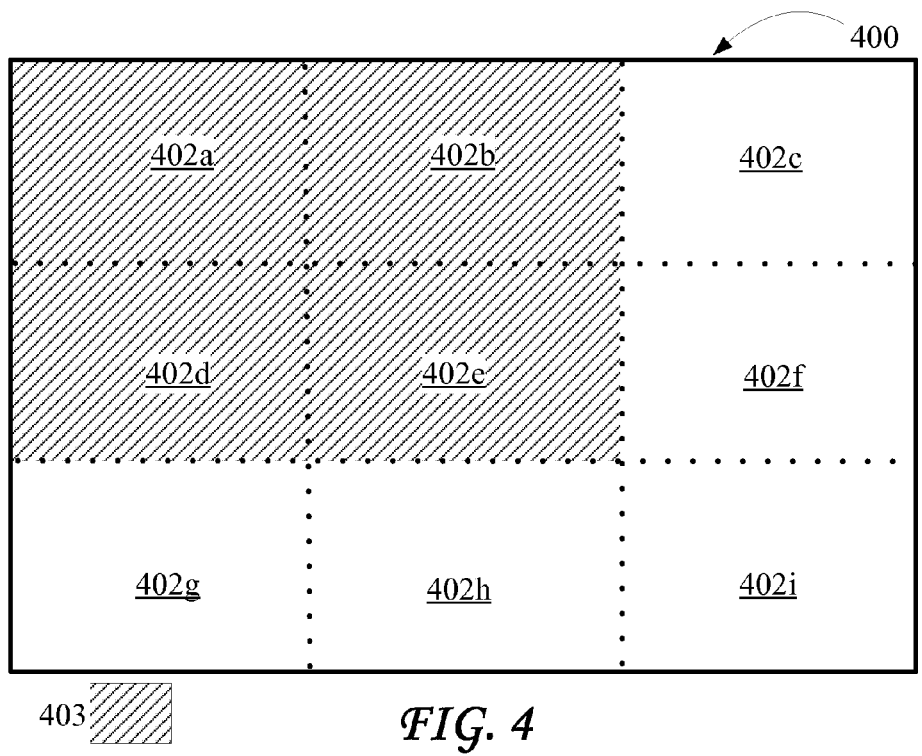
FIG. 4 is a diagram illustrating an example of grouping a portion of tiles of a picture into one tile group, where another portion of the tiles do not belong to the tile group.

FIG. 4 is a diagram illustrating an example of a picture 400 in a video sequence partitioned into (and coded as) tiles 402a, 402b. 402c, 402d, 402e, 402f, 402g, 402h, 402i, with only some tiles belonging to a tile group 403. For example, tiles 402a, 402b, 402d, 402e may belong to the tile group 403 and the remaining tiles 402c, 402f, 402g, 402h. 402i in the picture may not belong to any tile group. There may not be a constraint on how the pixels in the areas covered by the remaining tiles 402c, 402f, 402g, 402h. 402i may be predicted.

Although not illustrated in FIG. 3 or FIG. 4, a tile may belong to more than one tile group. For example, if 302a in FIG. 3 belongs to both 303 and 305, that is, 303={302a, 302b, 302d, 302e} and 305={302a, 302c, 302f, 302g, 302h. 302i}, then the pixels in 302a may be motion compensation predicted from the common area covered by 303 and 305, 303∩305, namely, 302a itself.

Figure 5:
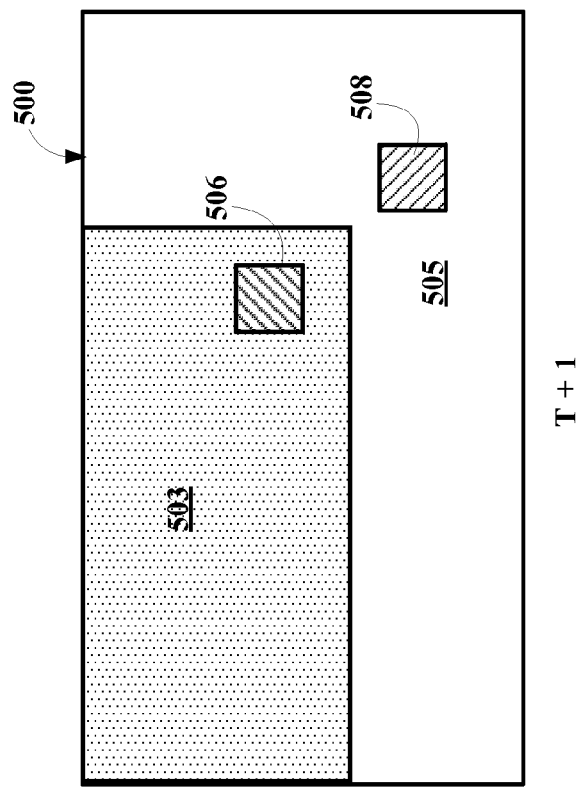
FIG. 5 is a diagram illustrating an example of a constraint on motion prediction of blocks in tile groups.
Figure 5:
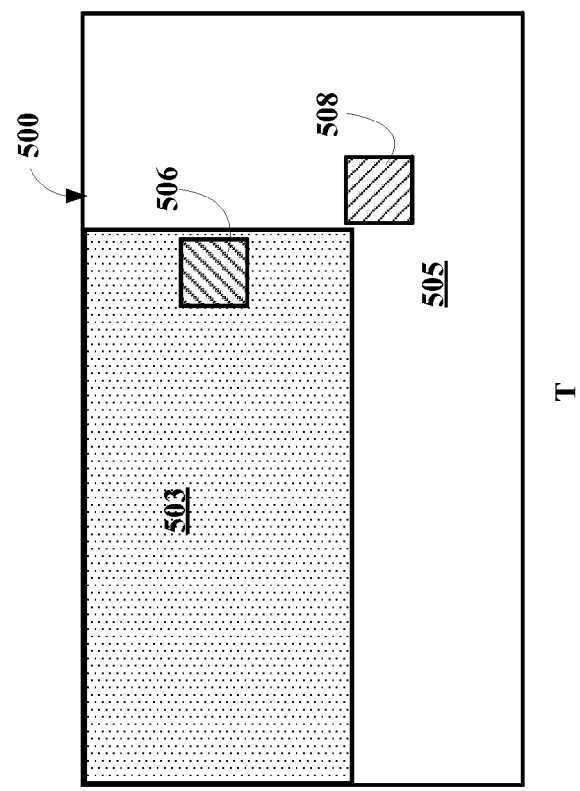

FIG. 5 is a diagram illustrating an example of a picture 500 in a video sequence partitioned into (and coded as) tiles (not depicted for simplicity of illustration) grouped into tile groups 503, 505 at a time instance (T). An ROI is not depicted for simplicity of illustration. The ROI may be represented by the tile group 503 or the tile group 505, although in practice, it is beneficial for the ROI to be slightly smaller than the tile group that it overlaps. For example, the tile group 503 may additionally contain a small margin outside of the ROI such that, if loop_filter_across_tiles_enabled_flag in Table 1 is set to 1, then in-loop filtering (e.g., deblocking filter, sample adaptive offset, and the like) may be performed along the tile boundaries without affecting the pixel values inside of the ROI. A video block 506 is within tile group 503 at time instance (T). A video block 508 is within tile group 505 at time instance (T).

At a time instance (T+1), it may be desirable to predict the blocks 506, 508 in the picture 500 at time instance (T+1) by using the picture 500 at time instance (T) as a reference picture. A constraint is imposed on the tile groups 503, 505. The video block 506 in the tile group 503 at time instance (T+1) may be predicted (e.g., only predicted) from a reference block that lies entirely within the boundaries of the tile group 503. The video block 508 at time instance (T+1) in the tile group 505 may be predicted (e.g., only predicted) from a reference block that lies entirely within the boundaries of the tile group 505. "Lie entirely within" refers to situations where the pixels that participate in motion compensated prediction, including motion interpolation due to fractional pixel motion vectors, do not lie within any other tile group's boundaries. This constraint may allow different tile groups to be independently decodable in the temporal domain. If reduced decoding of a ROI is desired, a first tile group may be defined to cover the ROI and a second tile group, or no tile group, may be defined to cover the rest of the picture. Such a configuration may allow the decoder to decode (e.g., only decode) the first tile group in a temporal series of pictures and be able to display the ROI. Defining a tile group such that a ROI lies entirely within the tile group may allow a decoder to decode (e.g., only decode) a series of temporal pictures of that tile group to display the ROI. Tiles in a picture may be partitioned into more than 2 tile groups according to the application's need, for example, if there is more than one ROI. Having more tiles groups may provide for more possibilities to support different ROIs. The constraint may be modified to allow pixels from a tile that is a member of two tile groups to be predicted from that tile (see above).

As shown in Table 1, tile related parameters may be signaled in the PPS in HEVC. Within a video sequence, different pictures may be allowed to use different PPS's. The tile parameters may change from picture to picture in the same video sequence. Although in most video applications the number of tiles and the locations of the tiles are likely to remain the same within a video sequence (e.g., a series of pictures), situations may arise where not only the configuration of tiles may be allowed to change from picture to picture in the same video sequence, but also the grouping of tiles may be allowed to change from picture to picture.

Figure 6:
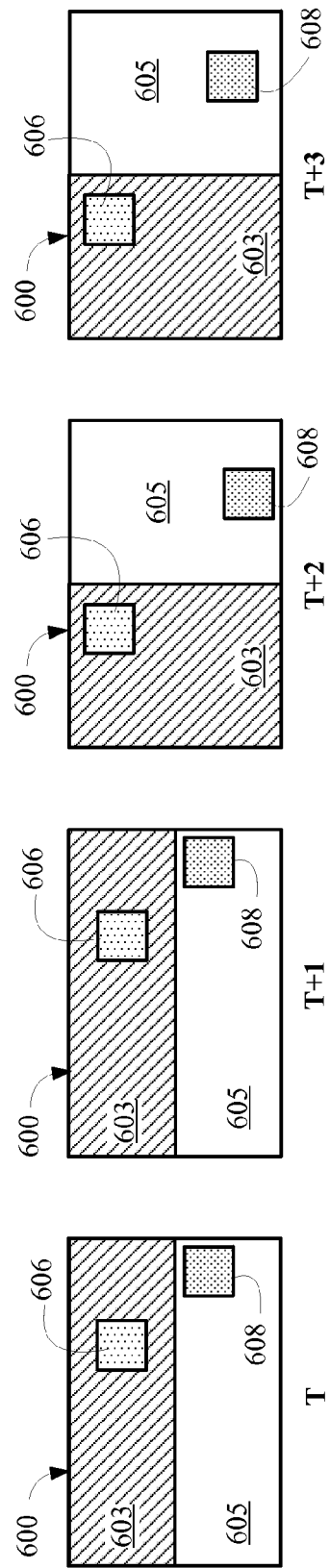
FIG. 6 is a diagram illustrating an example of a constraint on motion prediction of blocks in tile groups, even as the tile groups (and tiles) change shape.

FIG. 6 is a diagram illustrating an example of a picture 600 in a video sequence partitioned into (and coded as) tiles (not depicted for simplicity of illustration) grouped into tile groups 603, 605 at a time instance (T). An ROI is not depicted for simplicity of illustration. A video block 606 is within tile group 603 at time instance (T). A video block 608 is within tile group 605 at time instance (T).

At a time instance (T+1), it may be desirable to predict the blocks 606, 608 in the picture 600 by using the picture 600 at time instance (T) as a reference picture.

At a time instance (T+2), the tile groups 603, 605, have been partitioned differently from the picture 600 at time instance (T) and time instance (T+1), e.g., from top and bottom to left and right, however, video block 606 continues to lie entirely within tile group 603, and video block 608 continues to lie entirely within tile group 605. This example of pictures in the same sequence with different shapes of tiles and tile groups nonetheless satisfies the motion-prediction constraint discussed above, i.e., the blocks 606, 608 in the picture 600 at time instance (T+2) may be predicted by using the picture 600 at time instance (T+1) as a reference picture. A PPS signal may be sent before time instance (T) defining the tiles and tile groups. Another PPS signal may be sent between time instance (T+1) and time instance (T+2) defining the tiles and tile groups.

Figure 7:
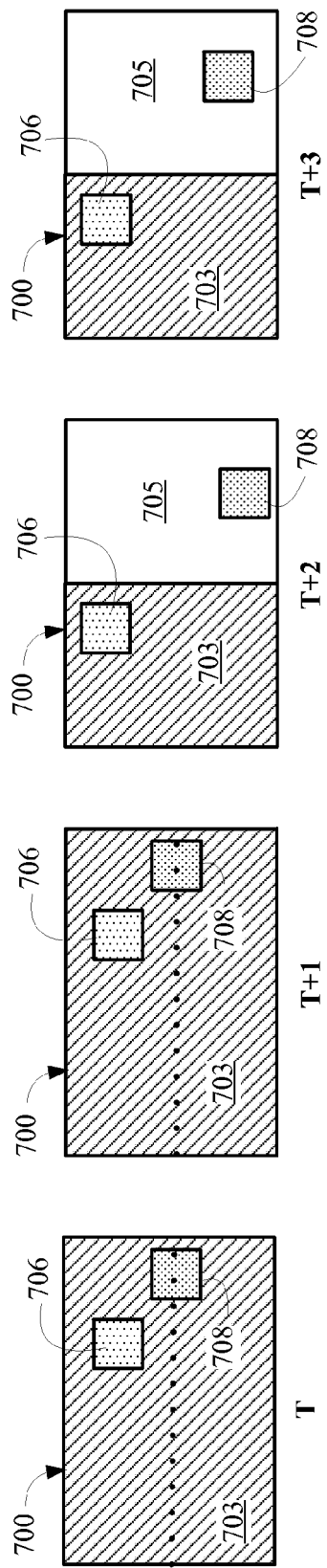
FIG. 7 is a diagram illustrating an example of a constraint on motion prediction of blocks in tile groups, even as the tiles change shape and a tile group is added.

FIG. 7 is a diagram illustrating an example of a picture 700 in a video sequence partitioned into (and coded as) tiles (depicted by a dotted line for simplicity of illustration) grouped into a tile group 703 at a time instance (T). An ROI is not depicted for simplicity of illustration. A video block 706 is within tile group 703 at time instance (T). A video block 708 is also within tile group 703 at time instance (T).

At a time instance (T+1), it may be desirable to predict the blocks 706, 708 in the picture 700 by using the picture 700 at time instance (T) as a reference picture.

At a time instance (T+2), the tile group 703 has been partitioned differently from the picture 700 at time instance (T) and time instance (T+1), and a new tile group 705 is created. Video block 706 continues to lie entirely within tile group 703. Video block 708 now lies within new tile group

705. This is an example illustrating different shapes of tiles and tile groups, and different numbers of tile groups, at different time instances. The tile group constraint described herein may dictate that, for time instances (T+2), (T+3), video block 706 may be predicted from tile group 703 at time instances (T), (T+1). Since tile group 703 may cover the entire picture at time instances (T), (T+1), there may be less restriction on motion compensated prediction (e.g., with the exception of some boundary conditions). Since tile group 705 did not exist at time instances (T), (T+1), for time instance (T+2), the video block 708 may not be constrained and may be predicted from anywhere in the picture. For time instance (T+3), the video block 708 may be predicted from anywhere in the picture at time instances (T), (T+1) (i.e., without any constraint), or it may be predicted from within tile group 705 at time instance (T+2).

Although not shown in FIG. 4 through FIG. 7, tile groups may consist of tiles that may or may not be spatially contiguous.

Tile groups may be signaled using the syntax in Table 2. The number of tile groups in the picture may be signaled first. For each tile group, the number of tiles included within a picture may be signaled. Each index of the tiles in the group may be signaled. The raster scan order may be used to index the tiles in a picture. The tiles in a tile group may have disjoint indexes and/or may be spatially disjoint. Various coding implementations may be applied to code the values of the syntax elements (e.g., as shown in Table 2). For example, ne(v) (Exponential Golomb code) and/or u(v) (fixed length coding) may be used. The values of the syntax elements (e.g., as shown in Table 2) may be bounded by the number of tiles in a picture. The number of bits may be determined accordingly if u(v) is used.

TABLE 2

Example of Tiles Groups

| tile_group ( ) { | Descriptor |
|---|---|
| num_tile_groups_minus1 | u(v) or ue(v) |
| for( i = 0; i <= num_tile_groups_minus1; i++ ) { | |
| num_tiles_in_group_minus1[ i ] | u(v) or ue(v) |
| for( j = 0; j <= num_tiles_in_group_minus1[ i ]; i++ ) | |
| tile_index[ i ][ j ] | u(v) or ue(v) |
| } | |
| } | |
| } | |

Different implementations may be utilized to incorporate the tile group syntax element into a video bitstream. Tile related parameters may be signaled in the PPS (e.g., as shown in Table 1). Tile group parameters (e.g., as shown in Table 2) may be signaled in the PPS (e.g., after the tile parameters are sent).

The tile groups may be signaled in Video Usability Information (VUI). VUI may be present as part of the Sequence Parameter Set (SPS). VUI may be used to convey a range of information to the receiver, such as but not limited to bitstream conformance, color space information, and bitstream constraints. VUI may include syntax elements that may be used to put a restriction on the usage of tiles in the bitstream. For example, tiles_fixed_structure_flag may be used in VUI. tiles_fixed_structure_flag may dictate whether a composition of tiles may change from picture to picture in the same video sequence. tiles_fixed_structure_flag may dictate whether one or more active PPS's in the same sequence may have different tile parameters. The examples provided in FIG. 6 and FIG. 7 may exist if tiles_fixed_structure_flag is set to 0. The tile group parameters may be signaled as part of the VUI, for example, as shown in Table 3.

TABLE 3

Example of Signaling Tile Group in VUI

| tile_group ( ) { | Descriptor |
|---|---|
| ... | |
| bitstream_restriction_flag | u(1) |
| if( bitstream_restriction_flag ) { | |
| tiles_fixed_structure_flag | u(1) |
| num_tile_groups_minus1 | u(v) or ue(v) |
| for( i = 0; i <= num_tile_groups_minus1; i++ ) { | |
| num_tiles_in_group_minus1[ i ] | u(v) or ue(v) |
| for(j = 0; | |
| j <= num_tiles_in_group_minus1[ i ]; i++ ) | |
| tile_index[ i ][ j ] | u(v) or ue(v) |
| } | |
| motion_vectors_over_pic_boundaries_flag | u(1) |
| ... | |
| } | u(v) or ue(v) |
| ... | |
| } | |

Tile group signaling may be provided via SEI messages. HEVC may define a set of Supplemental Enhancement Information (SEI) messages to convey supplemental information for various purposes. The SEI messages may provide useful information about the video to facilitate certain operations at the receiver side, although the messages may not be essential to the decoding process itself. For example, a display orientation SEI message (e.g., SEI payload type 47) may be used to inform the decoder about the orientation of one or more pictures in the video sequence (e.g., in HEVC). The client device may use an orientation SEI message to rotate the pictures as needed to ensure that the users may see the video in the correct orientation. If the orientation SEI message is not used, the bitstream may still be correctly decoded, but one or more of the pictures in the sequence may be displayed incorrectly (e.g., one or more pictures may be upside down, rotated by 90 degrees clock- or counter clock-wise, etc.). If a tile group(s) is signaled as SEI message, then a SEI payload type may be assigned to the tile group(s), for example, followed by syntax elements (e.g., as shown in Table 2).

Implementations utilizing tile groups and ROI coding to reduce decoding complexity may be described herein. Implementations may utilize tile groups and ROI coding to skip the decoding of one or more tile groups that may not overlap with the ROI. Tile groups may be used to further accelerate parallel decoding in finer granularity. For example, when multi-threaded decoding is performed using tiles, without tile groups, reference picture decoding may be synchronized at the picture level among different tiles. This may be because decoding of a tile in the subsequent picture may need to reference the entire reference picture. If tile groups are enabled, then reference picture decoding may be synchronized at the tile group level (e.g., which may be equivalent to the sub picture level). This may allow a decoder to better coordinate decoding load among the threads.

Figure 8A:
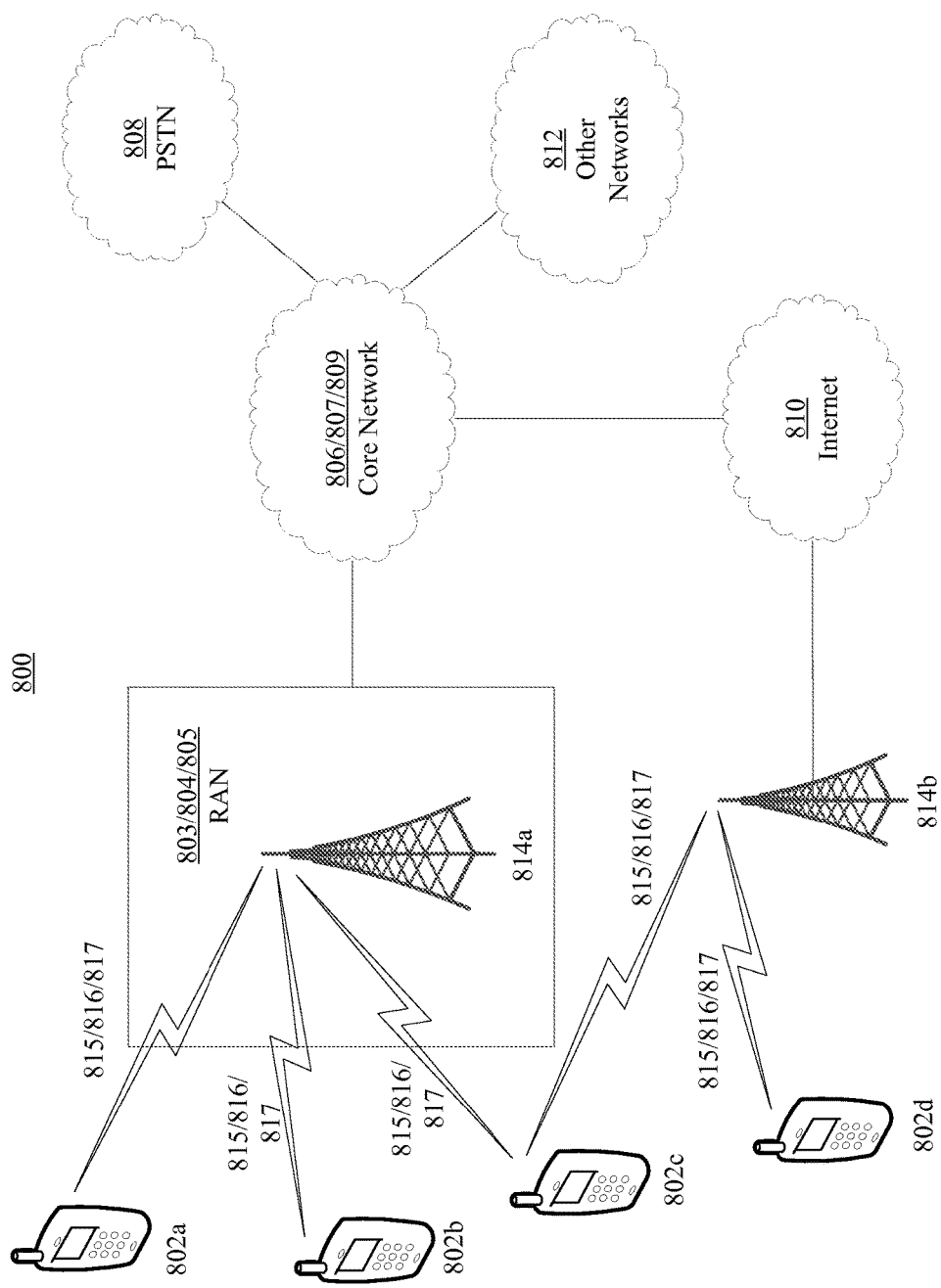
FIG. 8A is a system diagram of an example communications system in which one or more disclosed embodiments may be implemented.

FIG. 8A is a diagram of an example communications system 800 in which one or more disclosed embodiments may be implemented. The communications system 800 may be a multiple access system that provides content, such as voice, data, video, messaging, broadcast, etc., to multiple wireless users. The communications system 800 may enable multiple wireless users to access such content through the sharing of system resources, including wireless bandwidth. For example, the communications systems 800 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 8A, the communications system 800 may include wireless transmit/receive units (WTRUs) 802a, 802b, 802c, 802d, a radio access network (RAN) 803/804/805, a core network 806/807/809, a public switched telephone network (PSTN) 808, the Internet 810, and other networks 812, though it will be appreciated that the disclosed embodiments contemplate any number of WTRUs, base stations, networks, and/or network elements. Each of the WTRUs 802a, 802b, 802c, 802d may be any type of device configured to operate and/or communicate in a wireless environment. By way of example, the WTRUs 802a, 802b, 802c, 802d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 800 may also include a base station 814a and a base station 814b. Each of the base stations 814a, 814b may be any type of device configured to wirelessly interface with at least one of the WTRUs 802a, 802b, 802c, 802d to facilitate access to one or more communication networks, such as the core network 806/807/809, the Internet 810, and/or the networks 812. By way of example, the base stations 814a, 814b may be a base transceiver station (BTS), a Node-B, an eNode B, a Home Node B, a Home eNode B, a site controller, an access point (AP), a wireless router, and the like. While the base stations 814a, 814b are each depicted as a single element, it will be appreciated that the base stations 814a, 814b may include any number of interconnected base stations and/or network elements.

The base station 814a may be part of the RAN 803/804/805, which may also include other base stations and/or network elements (not shown), such as a base station controller (BSC), a radio network controller (RNC), relay nodes, etc. The base station 814a and/or the base station 814b may be configured to transmit and/or receive wireless signals within a particular geographic region, which may be referred to as a cell (not shown). The cell may further be divided into cell sectors. For example, the cell associated with the base station 814a may be divided into three sectors. Thus, in one embodiment, the base station 814a may include three transceivers, i.e., one for each sector of the cell. In another embodiment, the base station 814a may employ multiple-input multiple output (MIMO) technology and, therefore, may utilize multiple transceivers for each sector of the cell.

The base stations 814a, 814b may communicate with one or more of the WTRUs 802a, 802b, 802c, 802d over an air interface 815/816/817, which may be any suitable wireless communication link (e.g., radio frequency (RF), microwave, infrared (IR), ultraviolet (UV), visible light, etc.). The air interface 815/816/817 may be established using any suitable radio access technology (RAT).

More specifically, as noted above, the communications system 800 may be a multiple access system and may employ one or more channel access schemes, such as CDMA, TDMA, FDMA, OFDMA, SC-FDMA, and the like. For example, the base station 814a in the RAN 803/804/805 and the WTRUs 802a, 802b, 802c may implement a radio technology such as Universal Mobile Telecommunications System (UMTS) Terrestrial Radio Access (UTRA), which may establish the air interface 815/816/817 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 814a and the WTRUs 802a, 802b, 802c may implement a radio technology such as Evolved UMTS Terrestrial Radio Access (E-UTRA), which may establish the air interface 815/816/817 using Long Term Evolution (LTE) and/or LTE-Advanced (LTE-A).

In other embodiments, the base station 814a and the WTRUs 802a, 802b, 802c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 814b in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 814b and the WTRUs 802c, 802d may implement a radio technology such as IEEE 802.11 to establish a wireless local area network (WLAN). In another embodiment, the base station 814b and the WTRUs 802c, 802d may implement a radio technology such as IEEE 802.15 to establish a wireless personal area network (WPAN). In yet another embodiment, the base station 814b and the WTRUs 802c, 802d may utilize a cellular-based RAT (e.g., WCDMA, CDMA2000, GSM, LTE, LTE-A, etc.) to establish a picocell or femtocell. As shown in FIG. 8A, the base station 814b may have a direct connection to the Internet 810. Thus, the base station 814b may not be required to access the Internet 810 via the core network 806/807/809.

The RAN 803/804/805 may be in communication with the core network 806, which may be any type of network configured to provide voice, data, applications, and/or voice over internet protocol (VoIP) services to one or more of the WTRUs 802a, 802b, 802c, 802d. For example, the core network 806/807/809 may provide call control, billing services, mobile location-based services, pre-paid calling, Internet connectivity, video distribution, etc., and/or perform high-level security functions, such as user authentication. Although not shown in FIG. 8A, it will be appreciated that the RAN 803/804/805 and/or the core network 806/807/809 may be in direct or indirect communication with other RANs that employ the same RAT as the RAN 803/804/805 or a different RAT. For example, in addition to being connected to the RAN 803/804/805, which may be utilizing an E-UTRA radio technology, the core network 806/807/809 may also be in communication with another RAN (not shown) employing a GSM radio technology.

The core network 806/807/809 may also serve as a gateway for the WTRUs 802a, 802b, 802c, 802d to access the PSTN 808, the Internet 810, and/or other networks 812. The PSTN 808 may include circuit-switched telephone networks that provide plain old telephone service (POTS). The Internet 810 may include a global system of interconnected computer networks and devices that use common communication protocols, such as the transmission control protocol (TCP), user datagram protocol (UDP) and the internet protocol (IP) in the TCP/IP internet protocol suite. The networks 812 may include wired or wireless communications networks owned and/or operated by other service providers. For example, the networks 812 may include another core network connected to one or more RANs, which may employ the same RAT as the RAN 803/804/805 or a different RAT.

Some or all of the WTRUs 802a. 802b, 802c. 802d in the communications system 800 may include multi-mode capabilities, i.e., the WTRUs 802a, 802b, 802c, 802d may include multiple transceivers for communicating with different wireless networks over different wireless links. For example, the WTRU 802c shown in FIG. 8A may be configured to communicate with the base station 814a, which may employ a cellular-based radio technology, and with the base station 814b, which may employ an IEEE 802 radio technology.

Figure 8B:
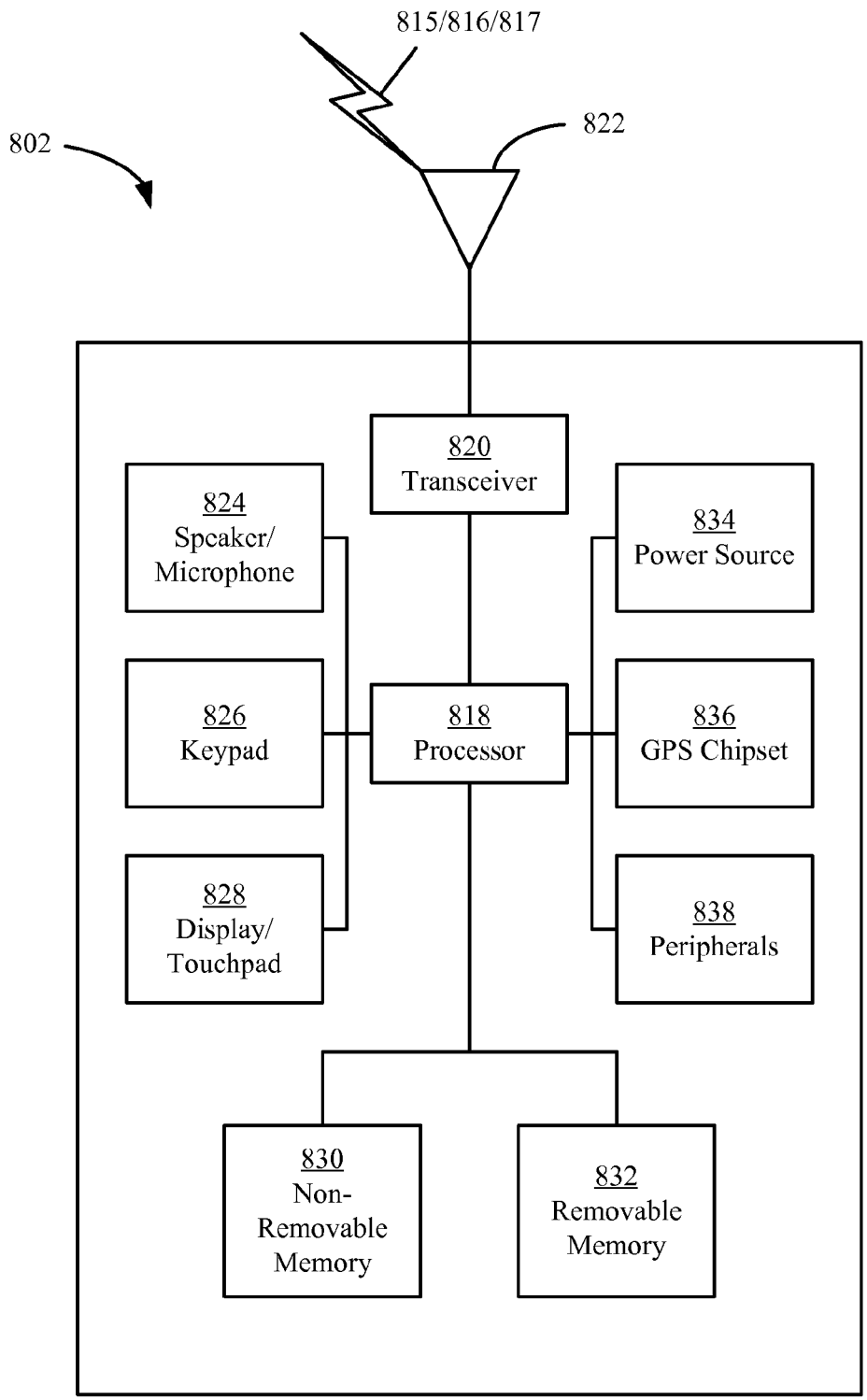
FIG. 8B is a system diagram of an example wireless transmit/receive unit (WTRU) that may be used within the communications system illustrated in FIG. 8A.

FIG. 8B is a system diagram of an example WTRU 802. As shown in FIG. 8B, the WTRU 802 may include a processor 818, a transceiver 820, a transmit/receive element 822, a speaker/microphone 824, a keypad 826, a display/touchpad 828, non-removable memory 830, removable memory 832, a power source 834, a global positioning system (GPS) chipset 836, and other peripherals 838. It will be appreciated that the WTRU 802 may include any subcombination of the foregoing elements while remaining consistent with an embodiment. Also, embodiments contemplate that the base stations 814a and 814b, and/or the nodes that base stations 814a and 814b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 818 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 818 may perform signal coding, data processing, power control, input/output processing, and/or any other functionality that enables the WTRU 802 to operate in a wireless environment. The processor 818 may be coupled to the transceiver 820, which may be coupled to the transmit/receive element 822. While FIG. 8B depicts the processor 818 and the transceiver 820 as separate components, it will be appreciated that the processor 818 and the transceiver 820 may be integrated together in an electronic package or chip.

The transmit/receive element 822 may be configured to transmit signals to, or receive signals from, a base station (e.g., the base station 814a) over the air interface 815/816/817. For example, in one embodiment, the transmit/receive element 822 may be an antenna configured to transmit and/or receive RF signals. In another embodiment, the transmit/receive element 822 may be an emitter/detector configured to transmit and/or receive IR. UV, or visible light signals, for example. In yet another embodiment, the transmit/receive element 822 may be configured to transmit and receive both RF and light signals. It will be appreciated that the transmit/receive element 822 may be configured to transmit and/or receive any combination of wireless signals.

In addition, although the transmit/receive element 822 is depicted in FIG. 8B as a single element, the WTRU 802 may include any number of transmit/receive elements 822. More specifically, the WTRU 802 may employ MIMO technology. Thus, in one embodiment, the WTRU 802 may include two or more transmit/receive elements 822 (e.g., multiple antennas) for transmitting and receiving wireless signals over the air interface 815/816/817.

The transceiver 820 may be configured to modulate the signals that are to be transmitted by the transmit/receive element 822 and to demodulate the signals that are received by the transmit/receive element 822. As noted above, the WTRU 802 may have multi-mode capabilities. Thus, the transceiver 820 may include multiple transceivers for enabling the WTRU 802 to communicate via multiple RATs, such as UTRA and IEEE 802.11, for example.

The processor 818 of the WTRU 802 may be coupled to, and may receive user input data from, the speaker/microphone 824, the keypad 826, and/or the display/touchpad 828 (e.g., a liquid crystal display (LCD) display unit or organic light-emitting diode (OLED) display unit). The processor 818 may also output user data to the speaker/microphone 824, the keypad 826, and/or the display/touchpad 828. In addition, the processor 818 may access information from, and store data in, any type of suitable memory, such as the non-removable memory 830 and/or the removable memory 832. The non-removable memory 830 may include random-access memory (RAM), read-only memory (ROM), a hard disk, or any other type of memory storage device. The removable memory 832 may include a subscriber identity module (SIM) card, a memory stick, a secure digital (SD) memory card, and the like. In other embodiments, the processor 818 may access information from, and store data in, memory that is not physically located on the WTRU 802, such as on a server or a home computer (not shown).

The processor 818 may receive power from the power source 834, and may be configured to distribute and/or control the power to the other components in the WTRU 802. The power source 834 may be any suitable device for powering the WTRU 802. For example, the power source 834 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 818 may also be coupled to the GPS chipset 836, which may be configured to provide location information (e.g., longitude and latitude) regarding the current location of the WTRU 802. In addition to, or in lieu of, the information from the GPS chipset 836, the WTRU 802 may receive location information over the air interface 815/816/817 from a base station (e.g., base stations 814a, 814b) and/or determine its location based on the timing of the signals being received from two or more nearby base stations. It will be appreciated that the WTRU 802 may acquire location information by way of any suitable location-determination method while remaining consistent with an embodiment.

The processor 818 may further be coupled to other peripherals 838, which may include one or more software and/or hardware modules that provide additional features, functionality and/or wired or wireless connectivity. For example, the peripherals 838 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8C:
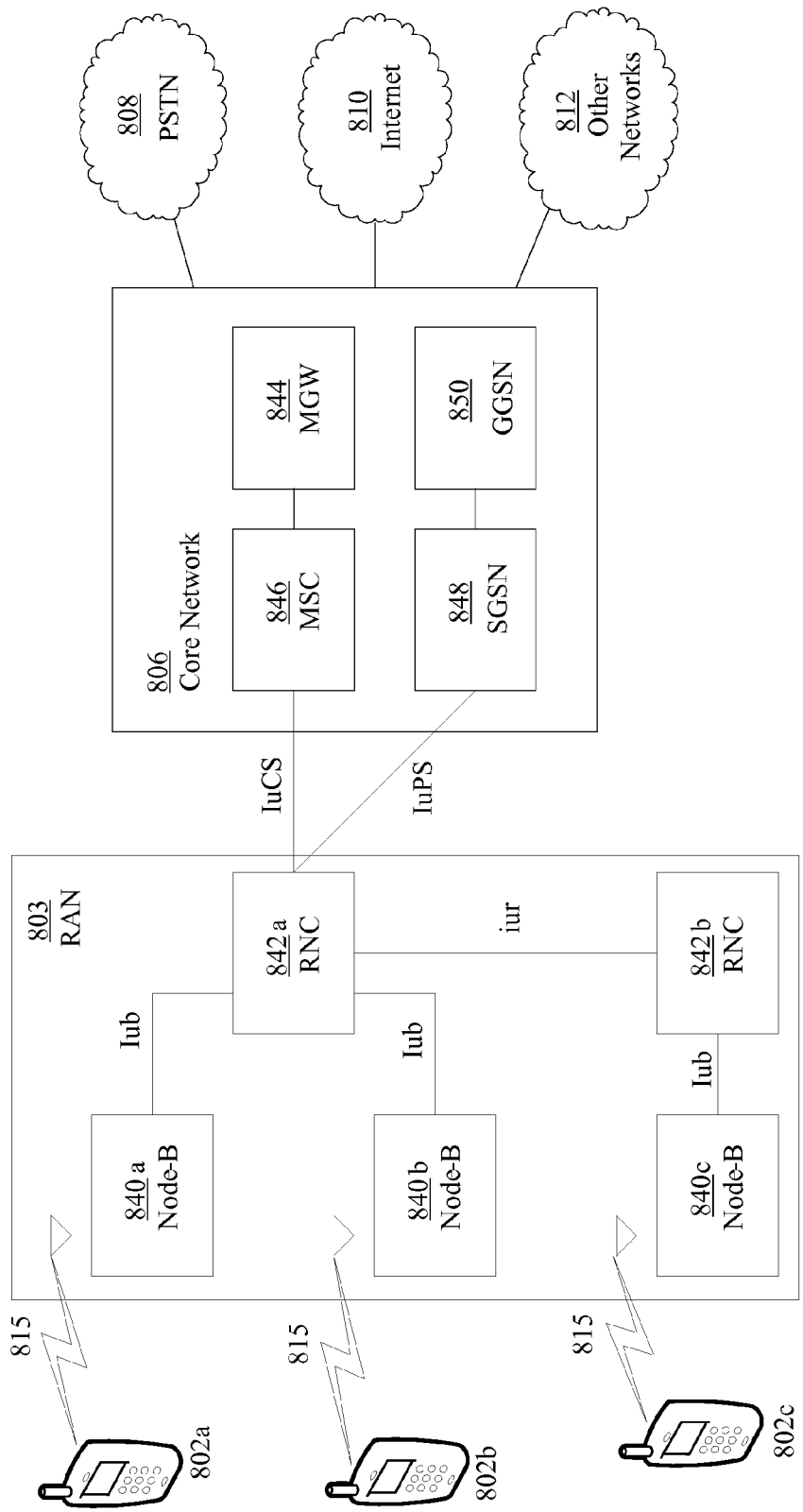
FIG. 8C is a system diagram of an example radio access network and an example core network that may be used within the communications system illustrated in FIG. 8A.

FIG. 8C is a system diagram of the RAN 803 and the core network 806 according to an embodiment. As noted above, the RAN 803 may employ a UTRA radio technology to communicate with the WTRUs 802*a*, 802*b*, 802*c* over the air interface 815. The RAN 804 may also be in communication with the core network 806. As shown in FIG. 8C, the RAN 803 may include Node-Bs 840*a*, 840*b*, 840*c*, which may each include one or more transceivers for communicating with the WTRUs 802*a*, 802*b*, 802*c* over the air interface 815. The Node-Bs 840*a*, 840*b*, 840*c* may each be associated with a particular cell (not shown) within the RAN 803. The RAN 803 may also include RNCs 842*a*, 842*b*. It will be appreciated that the RAN 803 may include any number of Node-Bs and RNCs while remaining consistent with an embodiment.

As shown in FIG. 8C, the Node-Bs 840*a*, 840*b* may be in communication with the RNC 842*a*. Additionally, the Node-B 840*c* may be in communication with the RNC 842*b*. The Node-Bs 840*a*, 840*b*, 840*c* may communicate with the respective RNCs 842*a*, 842*b* via an Iub interface. The RNCs 842*a*, 842*b* may be in communication with one another via an Iur interface. Each of the RNCs 842*a*, 842*b* may be configured to control the respective Node-Bs 840*a*, 840*b*, 840*c* to which it is connected. In addition, each of the RNCs 842*a*, 842*b* may be configured to carry out or support other functionality, such as outer loop power control, load control, admission control, packet scheduling, handover control macrodiversity, security functions, data encryption, and the like.

The core network 806 shown in FIG. 8C may include a media gateway (MGW) 844, a mobile switching center (MSC) 846, a serving GPRS support node (SGSN) 848, and/or a gateway GPRS support node (GGSN) 850. While each of the foregoing elements are depicted as part of the core network 806, it will be appreciated that any one of these elements may be owned and/or operated by an entity other than the core network operator.

The RNC 842*a* in the RAN 803 may be connected to the MSC 846 in the core network 806 via an IuCS interface. The MSC 846 may be connected to the MGW 844. The MSC 846 and the MGW 844 may provide the WTRUs 802*a*, 802*b*, 802*c* with access to circuit-switched networks, such as the PSTN 808, to facilitate communications between the WTRUs 802*a*, 802*b*, 802*c* and traditional land-line communications devices.

The RNC 842*a* in the RAN 803 may also be connected to the SGSN 848 in the core network 806 via an IuPS interface. The SGSN 848 may be connected to the GGSN 850. The SGSN 848 and the GGSN 850 may provide the WTRUs 802*a*, 802*b*, 802*c* with access to packet-switched networks, such as the Internet 810, to facilitate communications between and the WTRUs 802*a*, 802*b*, 802*c* and IP-enabled devices.

As noted above, the core network 806 may also be connected to the networks 812, which may include other wired or wireless networks that are owned and/or operated by other service providers.

Figure 8D:
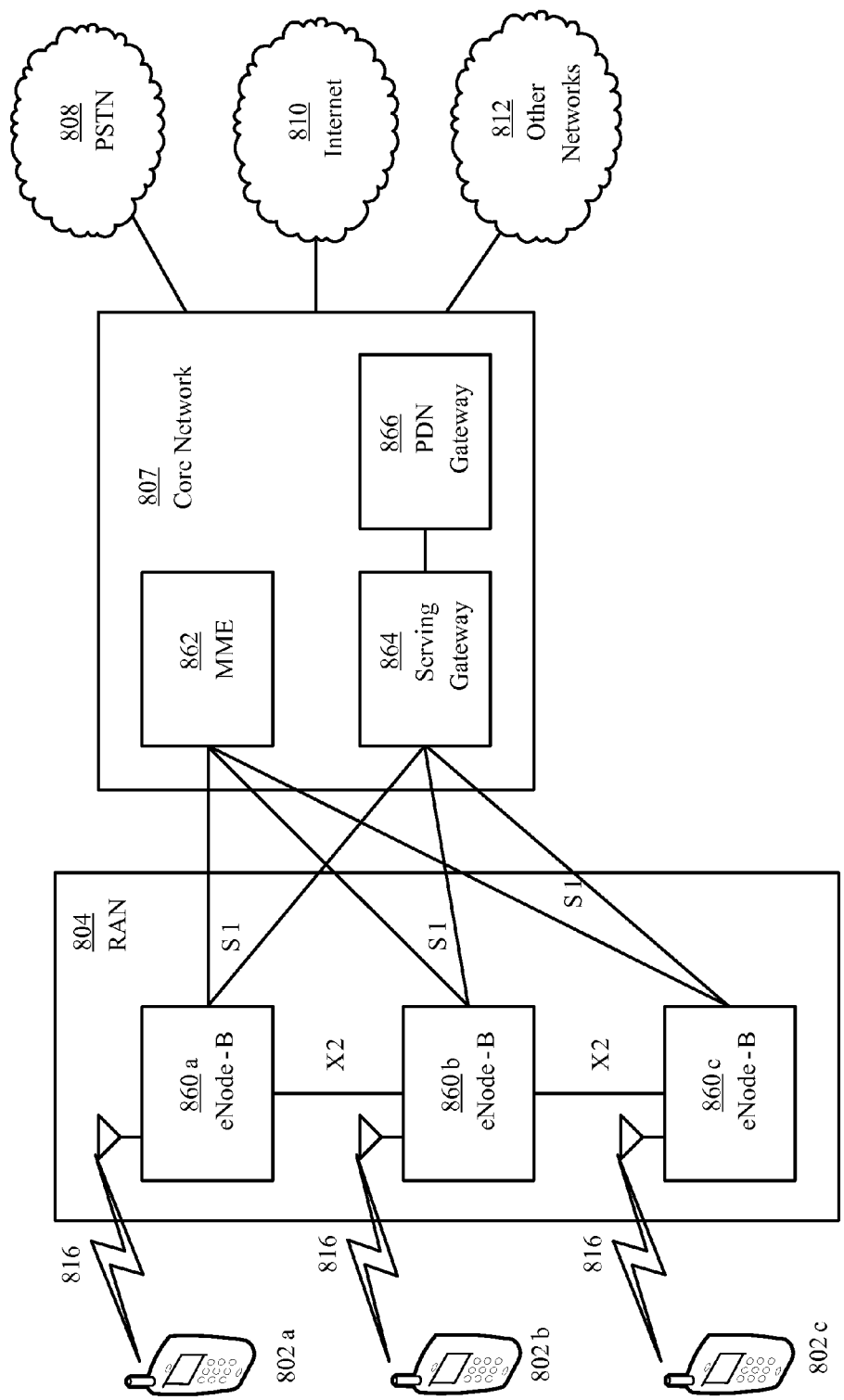
FIG. 8D is a system diagram of another example radio access network and another example core network that may be used within the communications system illustrated in FIG. 8A.

FIG. 8D is a system diagram of the RAN 804 and the core network 807 according to another embodiment. As noted above, the RAN 804 may employ an E-UTRA radio technology to communicate with the WTRUs 802*a*, 802*b*, 802*c* over the air interface 816. The RAN 804 may also be in communication with the core network 807.

The RAN 804 may include eNode-Bs 860*a*, 860*b*, 860*c*, though it will be appreciated that the RAN 804 may include any number of eNode-Bs while remaining consistent with an embodiment. The eNode-Bs 860*a*, 860*b*, 860*c* may each include one or more transceivers for communicating with the WTRUs 802*a*, 802*b*, 802*c* over the air interface 816. In one embodiment, the eNode-Bs 860*a*, 860*b*, 860*c* may implement MIMO technology. Thus, the eNode-B 860*a*, for example, may use multiple antennas to transmit wireless signals to, and receive wireless signals from, the WTRU 802*a*.

Each of the eNode-Bs 860*a*, 860*b*, 860*c* may be associated with a particular cell (not shown) and may be configured to handle radio resource management decisions, handover decisions, scheduling of users in the uplink and/or downlink, and the like. As shown in FIG. 8D, the eNode-Bs 860*a*, 860*b*, 860*c* may communicate with one another over an X2 interface.

The core network 807 shown in FIG. 8D may include a mobility management gateway (MME) 862, a serving gateway 864, and a packet data network (PDN) gateway 866. While each of the foregoing elements are depicted as part of the core network 807, it will be appreciated that any one of these elements may be owned and/or operated by an entity other than the core network operator.

The MME 862 may be connected to each of the eNode-Bs 860*a*, 860*b*, 860*c* in the RAN 804 via an SI interface and may serve as a control node. For example, the MME 862 may be responsible for authenticating users of the WTRUs 802*a*, 802*b*, 802*c*, bearer activation/deactivation, selecting a particular serving gateway during an initial attach of the WTRUs 802*a*, 802*b*, 802*c*, and the like. The MME 862 may also provide a control plane function for switching between the RAN 804 and other RANs (not shown) that employ other radio technologies, such as GSM or WCDMA.

The serving gateway 864 may be connected to each of the eNode Bs 860*a*, 860*b*, 860*c* in the RAN 804 via the SI interface. The serving gateway 864 may generally route and forward user data packets to/from the WTRUs 802*a*, 802*b*, 802*c*. The serving gateway 864 may also perform other functions, such as anchoring user planes during inter-eNode B handovers, triggering paging when downlink data is available for the WTRUs 802*a*, 802*b*, 802*c*, managing and storing contexts of the WTRUs 802*a*, 802*b*, 802*c*, and the like.

The serving gateway 864 may also be connected to the PDN gateway 866, which may provide the WTRUs 802*a*, 802*b*, 802*c* with access to packet-switched networks, such as the Internet 810, to facilitate communications between the WTRUs 802*a*, 802*b*, 802*c* and IP-enabled devices.

The core network 807 may facilitate communications with other networks. For example, the core network 807 may provide the WTRUs 802*a*, 802*b*, 102*c* with access to circuit-switched networks, such as the PSTN 808, to facilitate communications between the WTRUs 802*a*, 802*b*, 802*c* and traditional land-line communications devices. For example, the core network 807 may include, or may communicate with, an IP gateway (e.g., an IP multimedia subsystem (IMS) server) that serves as an interface between the core network 807 and the PSTN 808. In addition, the core network 807 may provide the WTRUs 802*a*, 802*b*, 802*c* with access to the networks 812, which may include other wired or wireless networks that are owned and/or operated by other service providers.

Figure 8E:
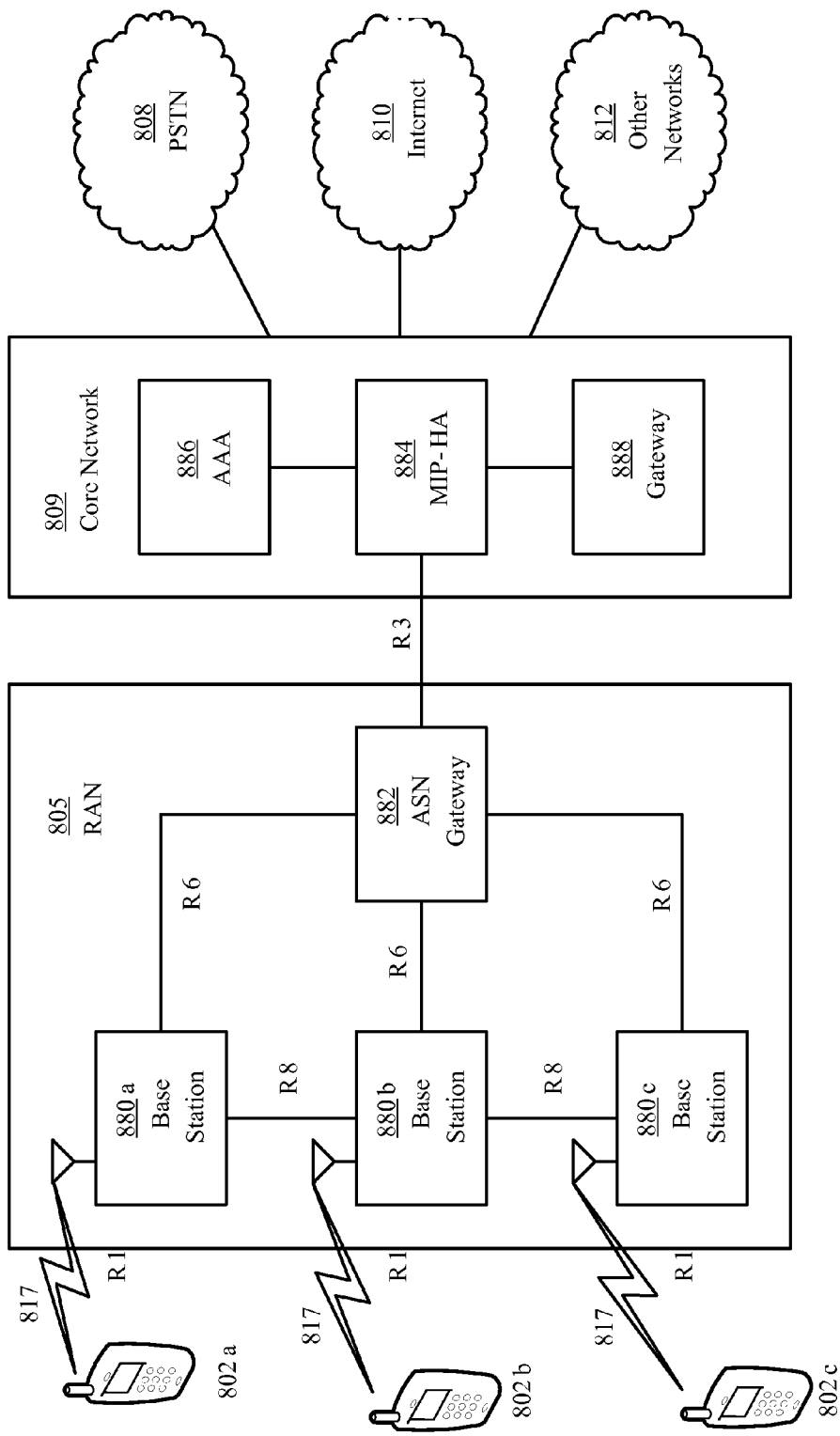
FIG. 8E is a system diagram of another example radio access network and another example core network that may be used within the communications system illustrated in FIG. 8A.

FIG. 8E is a system diagram of the RAN 805 and the core network 809 according to another embodiment. The RAN 805 may be an access service network (ASN) that employs IEEE 802.16 radio technology to communicate with the WTRUs 802a, 802b, 802c over the air interface 817. As will be further discussed below, the communication links between the different functional entities of the WTRUs 802a, 802b, 802c, the RAN 805, and the core network 809 may be defined as reference points.

As shown in FIG. 8E, the RAN 805 may include base stations 880a, 880b, 880c, and an ASN gateway 882, though it will be appreciated that the RAN 805 may include any number of base stations and ASN gateways while remaining consistent with an embodiment. The base stations 880a, 880b, 880c may each be associated with a particular cell (not shown) in the RAN 805 and may each include one or more transceivers for communicating with the WTRUs 802a, 802b, 802c over the air interface 817. In one embodiment, the base stations 880a, 880b, 880c may implement MIMO technology. Thus, the base station 880a, for example, may use multiple antennas to transmit wireless signals to, and receive wireless signals from, the WTRU 802a. The base stations 880a, 880b, 880c may also provide mobility management functions, such as handoff triggering, tunnel establishment, radio resource management, traffic classification, quality of service (QoS) policy enforcement, and the like. The ASN gateway 882 may serve as a traffic aggregation point and may be responsible for paging, caching of subscriber profiles, routing to the core network 809, and the like.

The air interface 817 between the WTRUs 802a, 802b, 802c and the RAN 805 may be defined as an R1 reference point that implements the IEEE 802.16 specification. In addition, each of the WTRUs 802a, 802b, 802c may establish a logical interface (not shown) with the core network 809. The logical interface between the WTRUs 802a, 802b, 802c and the core network 809 may be defined as an R2 reference point, which may be used for authentication, authorization, IP host configuration management, and/or mobility management.

The communication link between each of the base stations 880a, 880b. 880c may be defined as an R8 reference point that includes protocols for facilitating WTRU handovers and the transfer of data between base stations. The communication link between the base stations 190a, 880b, 880c and the ASN gateway 882 may be defined as an R6 reference point. The R6 reference point may include protocols for facilitating mobility management based on mobility events associated with each of the WTRUs 802a, 802b, 800c.

As shown in FIG. 8E, the RAN 805 may be connected to the core network 809. The communication link between the RAN 805 and the core network 809 may defined as an R3 reference point that includes protocols for facilitating data transfer and mobility management capabilities, for example. The core network 809 may include a mobile IP home agent (MIP-HA) 884, an authentication, authorization, accounting (AAA) server 886, and a gateway 888. While each of the foregoing elements are depicted as part of the core network 809, it will be appreciated that any one of these elements may be owned and/or operated by an entity other than the core network operator.

The MIP-HA 884 may be responsible for IP address management, and may enable the WTRUs 802a, 802b, 802c to roam between different ASNs and/or different core networks. The MIP-HA 884 may provide the WTRUs 802a, 802b, 802c with access to packet-switched networks, such as the Internet 810, to facilitate communications between the WTRUs 802a, 802b, 802c and IP-enabled devices. The AAA server 886 may be responsible for user authentication and for supporting user services. The gateway 888 may facilitate interworking with other networks. For example, the gateway 888 may provide the WTRUs 802a, 802b, 802c with access to circuit-switched networks, such as the PSTN 808, to facilitate communications between the WTRUs 802a, 802b, 802c and traditional land-line communications devices. In addition, the gateway 888 may provide the WTRUs 802a, 802b, 802c with access to the networks 812, which may include other wired or wireless networks that are owned and/or operated by other service providers.

Although not shown in FIG. 8E, it will be appreciated that the RAN 805 may be connected to other ASNs and the core network 809 may be connected to other core networks. The communication link between the RAN 805 the other ASNs may be defined as an R4 reference point, which may include protocols for coordinating the mobility of the WTRUs 802a, 802b, 802c between the RAN 805 and the other ASNs. The communication link between the core network 809 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

The invention claimed is:

1. A video coding device comprising:
a processor configured to:
  receive an encoded video sequence that comprises a tile group;
  receive tile group parameters associated with the encoded video sequence;
  determine boundaries of the tile group using the tile group parameters; and
  predict a block within the boundaries of the tile group in a first picture of the encoded video sequence using temporal motion compensated prediction, wherein the temporal motion compensated prediction is constrained to using reference pixels, in a second picture of the encoded video sequence, that are within the boundaries of the tile group.

2. The video coding device of claim 1, wherein the processor is further configured to:
  determine a region of interest (ROI) in the first picture of the encoded video sequence;
  determine that the tile group overlaps the ROI; and
  decode the tile group that overlaps the ROI in the first picture while skipping decoding of one or more tile groups that do not overlap the ROI.

3. The video coding device of claim 2, wherein the ROI is determined based on input from a user.

4. The video coding device of claim 2, wherein the tile group is a first tile group, and wherein the processor is further configured to:
determine that the ROI has moved from a first location in the first picture to a second location in a third picture of the encoded video sequence such that the first tile group does not overlap the ROI;
determine a second tile group that overlaps the ROI; and
decode the second tile group that overlaps the ROI in the third picture while skipping decoding of one or more tile groups that do not overlap the ROI.

5. The video coding device of claim 1, wherein the tile group parameters indicate a number of tile groups, a number of tiles in each of the number of tile groups, and one or more tile indexes.

6. The video coding device of claim 5, wherein the one or more tile indexes are based on a raster scan order and indicates a location of the tile among the number of tiles in the tile group.

7. The video coding device of claim 1, wherein the tile group parameters are received via a supplemental enhancement information (SEI) message or a video usability information (VUI) message.

8. The video coding device of claim 1, wherein the processor is further configured to decode the first picture using the predicted block of the tile group.

9. The video coding device of claim 1, wherein the second picture is a reference picture that comprises the reference pixels.

10. The video coding device of claim 1, wherein the tile group is a first tile group, and wherein the block is a first block, and wherein the encoded video sequence further comprises a second tile group, the processor further configured to predict a second block within the boundaries of the second tile group in the first picture using the temporal motion compensated prediction, wherein the temporal motion compensated prediction is constrained to using reference pixels, in the second picture of the encoded video sequence, that are within the boundaries of the second tile group.

11. A method of video coding, the method comprising:
receiving an encoded video sequence that comprises a tile group;
receiving tile group parameters associated with the encoded video sequence;
determining boundaries of the tile group using the tile group parameters; and
predicting a block within the boundaries of the tile group in a first picture of the encoded video sequence using temporal motion compensated prediction, wherein the temporal motion compensated prediction is constrained to using reference pixels, in a second picture of the encoded video sequence, that are within the boundaries of the tile group.

12. The method of claim 11, further comprising:
determining a region of interest (ROI) in the first picture of the encoded video sequence;
determining that the tile group overlaps the ROI; and
decoding the tile group that overlaps the ROI in the first picture while skipping decoding of one or more tile groups that do not overlap the ROI.

13. The method of claim 12, wherein the ROI is determined based on input from a user.

14. The method of claim 12, wherein the tile group is a first tile group, the method further comprising:
determining that the ROI has moved from a first location in the first picture to a second location in a third picture of the encoded video sequence such that the first tile group does not overlap the ROI;
determining a second tile group that overlaps the ROI; and
decoding the second tile group that overlaps the ROI in the third picture while skipping decoding of one or more tile groups that do not overlap the ROI.

15. The method of claim 11, wherein the tile group parameters indicate a number of tile groups, a number of tiles in each of the number of tile groups, and one or more tile indexes.

16. The method of claim 15, wherein the one or more tile indexes are based on a raster scan order and indicates a location of the tile among the number of tiles in the tile group.

17. The method of claim 11, wherein the tile group parameters are received via a supplemental enhancement information (SEI) message or a video usability information (VUI) message.

18. The method of claim 11, further comprising decoding the first picture using the predicted block of the tile group.

19. The method of claim 11, wherein the second picture is a reference picture that comprises the reference pixels.

20. The method of claim 11, wherein the tile group is a first tile group, and wherein the block is a first block, and wherein the encoded video sequence further comprises a second tile group, the method further comprising predicting a second block within the boundaries of the second tile group in the first picture using the temporal motion compensated prediction, wherein the temporal motion compensated prediction is constrained to using reference pixels, in the second picture of the encoded video sequence, that are within the boundaries of the second tile group.

* * * * *